United States Patent
Yan

(10) Patent No.: US 10,046,458 B2
(45) Date of Patent: Aug. 14, 2018

(54) SYSTEM OF CONFINING ROBOT MOVEMENT ACTIONS AND A METHOD THEREOF

(71) Applicant: Jason Yan, New Taipei (TW)

(72) Inventor: Jason Yan, New Taipei (TW)

(*) Notice: Subject to any disclaimer, the term of this patent is extended or adjusted under 35 U.S.C. 154(b) by 0 days.

(21) Appl. No.: 14/738,302

(22) Filed: Jun. 12, 2015

(65) Prior Publication Data

US 2016/0214258 A1    Jul. 28, 2016

(30) Foreign Application Priority Data

Jan. 23, 2015 (TW) .............................. 104102186 A

(51) Int. Cl.
*G05B 19/18* (2006.01)
*B25J 9/16* (2006.01)
*G05D 1/02* (2006.01)

(52) U.S. Cl.
CPC .............. *B25J 9/1676* (2013.01); *B25J 9/163* (2013.01); *B25J 9/1694* (2013.01); *G05D 1/0214* (2013.01); *G05D 1/0242* (2013.01); *G05D 2201/0215* (2013.01); *Y10S 901/01* (2013.01); *Y10S 901/09* (2013.01)

(58) Field of Classification Search
CPC ........ B25J 9/1676; B25J 9/1694; B25J 9/163; Y10S 901/01; Y10S 901/09; G05D 1/0214; G05D 1/0242; G05D 2201/0215
See application file for complete search history.

(56) References Cited

U.S. PATENT DOCUMENTS

| | | | |
|---|---|---|---|
| 6,690,134 B1 * | 2/2004 | Jones | A47L 9/009 180/167 |
| 7,188,000 B2 * | 3/2007 | Chiappetta | G05D 1/0242 15/319 |
| 7,579,803 B2 | 8/2009 | Jones et al. | |
| 8,688,272 B2 * | 4/2014 | Hong | G05D 1/0234 700/253 |
| 9,089,249 B2 * | 7/2015 | Hung | A47L 9/2805 |
| 2008/0039974 A1 * | 2/2008 | Sandin | G05D 1/0255 700/258 |

(Continued)

FOREIGN PATENT DOCUMENTS

CN     102048499 A    5/2011

*Primary Examiner* — Nicholas Kiswanto
(74) *Attorney, Agent, or Firm* — Muncy, Geissler, Olds & Lowe, P.C.

(57) ABSTRACT

The present disclosure relates to a system for confining movement actions of a robot and a method thereof, the system comprising a virtual wall device and a robot, the virtual wall device is configured to receive a barrier detection signal in a predetermined receiving range and to emit a virtual wall signal, through the virtual wall signal, a work space can be virtually divided into a first work area and a second work area. The robot continuously emits the barrier detection signal during its operation and is able to receive the virtual wall signal; when the robot gets into the predetermined emitting range and receives the virtual wall signal, the robot decides to get across or escape by checking the information from the virtual wall signal with its passing record. Therefore, the system can be applied to confine the robot to operate in the first work area or the second work area.

4 Claims, 7 Drawing Sheets

(56) References Cited

U.S. PATENT DOCUMENTS

2013/0199570 A1\* 8/2013 Lee .................... G05D 1/0234
  134/18
2014/0114525 A1\* 4/2014 Ebrahimi
  Afrouzi ............... G05D 1/0242
  701/23

\* cited by examiner

SYSTEM OF CONFINING ROBOT MOVEMENT ACTIONS AND A METHOD THEREOF

BACKGROUND OF THE INVENTION

Field of the Invention

The present invention relates to a robot, particularly a system of confining the movement of a robot in several areas and a method thereof.

Description of Related Art

Cleaning robot, an automatic mobile device which can automatically move and operate cleaning tasks in several areas without the direct control from a user. It is nowadays widely used in any indoor place such as a house of family or an office for cleaning. Some of the cleaning robots are selective to have the function of floor wiping with the aid of a broom or the function of trash or dust vacuuming in its cruise.

However, current cleaning robots still have many restrictions. For example, the lay-out of the furniture usually differs from a house to another one, or though the furniture in the cleaning space remains the same, where the items being placed in the space might be rearranged adapt to different requirements. Therefore, setting a predetermined cruising route would not be ideal for controlling a cleaning robot.

Thus, in order to prevent an cleaning robot in operation keep bumping into obstacles, such as furniture or walls, or accidentally falling off from an balcony or stairs, settling some barrier devices (such as virtual wall devices) which can send barrier signals outward for confining the cleaning robot from passing several locations in the space of operation, can be considered as a solution; correspondingly, the cleaning robot in operation usually has at least a receiver unit for receiving the barrier signals. Therefore, the cleaning robot may have a chance of moving backward or dodging before the collision or falling occurred.

Take a prior art for instance, which is a method of confining a robot referenced as U.S. Pat. No. 7,579,803, the method is applied to a portable barrier signal transmitting device and a mobile robot. The portable barrier signal transmitting device emits a signal along an axis for creating a virtual barrier area which the robot is not allowed to pass; said mobile robot would detect and keep itself away from that signal. According to the description of an embodiment of that case, said signal is an infrared frequency signal and the robot correspondingly has an omni-directional RCON detector; once the signal is detected by the omni-directional RCON detector, the robot would be redirected for leaving in accordance with a barrier avoidance algorithm. That is, said robot can be effectively prevented from unexpected collisions or falling.

However, since the portable barrier signal transmitting device in U.S. Pat. No. 7,579,803 needs to emit signals outward continuously in operation, it takes a huge consumption of power. Considering that most of portable barrier signal transmitting devices still take batteries as power supplies; as to provide more power, using larger batteries would be an option, however, larger device volume that comes along would be another disadvantage.

An improved method of China Patent Number CN102048499 is developed for ameliorating the drawbacks of U.S. Pat. No. 7,579,803. It provides a mobile robot system and a control method thereof, comprising a mobile robot which emits signals in movement areas and a beacon machine (the beacon machine functions as the portable barrier signal transmitting device in U.S. Pat. No. 7,579, 803). When a signal from the mobile robot is detected within the FOV (Field of View) of a remote control reception module of the beacon machine, said beacon machine transmits a response signal to the mobile robot for replying instead of transmitting signals all the time. As such, the mobile robot can be successfully redirected by the response signal for the cleaning in different rooms and the power consumption of the beacon machine can be reduced as well.

Though the problem of uneconomical power consumption in U.S. Pat. No. 7,579,803 is resolved in use of the technique of CN102048499, yet the complicate structure of the beacon machine become another issue because it necessitate to have more components assembled in the manufacturing process of the beacon machine, which raises the cost of manufacturing. Comparing said issue of cost with the problem of power consumption, it cannot say that the progression of patent CN102048499 has overcame the drawbacks of U.S. Pat. No. 7,579,803. Thus, providing a beacon machine or portable barrier signal transmitting device having simple structure and efficient is a target to people in the art.

SUMMARY OF THE INVENTION

The present invention relates to a virtual wall device which featuring with simple structure and electricity efficiency for developing a beacon or a portable barrier signal transmitting device in prior arts; and an automatic robot which confines its movements according to a virtual wall signal emitted from the virtual wall device. The purpose of present invention is to provide an economical resolution to the problem of high energy-consuming meanwhile overcome the complication of manufacturing.

To achieve above purpose, a system of confining robot movement actions is therefore developed, which comprises: a virtual wall device set in a work space to receive a detection signal in a predetermined receiving range; said virtual wall device further emits a virtual wall signal in a predetermined emitting range, the virtual wall signal divides the work space into a first work area and a second work area when the virtual wall device is receiving the barrier detection signal, the virtual wall device would stop to emits said virtual wall signal when the barrier detection signal is no longer received.

Furthermore, a robot operating in the work space keep emitting the barrier detection signal and capable of receiving said virtual wall signal in the predetermined emitting range from the virtual wall device; and determine whether to get across the virtual wall signal in order to confine said robot for operating in the first work area or the second work area.

To achieve above purpose, a method of confining robot movement actions applied among a virtual wall device and a robot is provided, which comprises steps of: emitting a barrier detection signal, by the robot operating in a work space; detecting and receiving the barrier detection signal, via the virtual wall device, in a predetermined receiving range inside the work space; wherein the reception of the barrier detection signal triggers the virtual wall device to emit a virtual wall signal, dividing the work space into a first work area and a second work area; the robot continuously operating until it receives the virtual wall signal; wherein the reception and decoding of the virtual wall signal determines whether the robot to get across the predetermined emitting range of the virtual wall signal or escape from it, which confines the movement of the robot in the first work area or the second work area.

Compared with the systems and methods in prior arts, the system of confining robot movements and the method thereof in the present invention has the following advantages:

1. For robots in the art, they necessitate to have the function of signal emitting for detecting and avoiding obstacles, and the function of receiving external control signals and responding; hence, the method of present invention can be applied without extra manufacturing costs since there is no need for settling new components on the robot;

2. The virtual wall device of present invention only emits the virtual wall signal when the barrier detection signal from the robot is detectable, which is more economic than the techniques in prior art.

3. The virtual wall device is of use to confine the cruising of the robot in the work space barely by detecting the barrier detection signal and emitting the virtual wall signal according to the method of present invention. Simple structure of the virtual wall device brings more simple and economic manufacturing process.

DETAILED DESCRIPTION OF THE INVENTION

A system of confining robot movement actions and a method thereof will be further illustrated by embodiments accompanying with drawings for better understanding. It should be understood the embodiments hereinafter are to explain but not to limit the scope of present invention.

Figure 1:
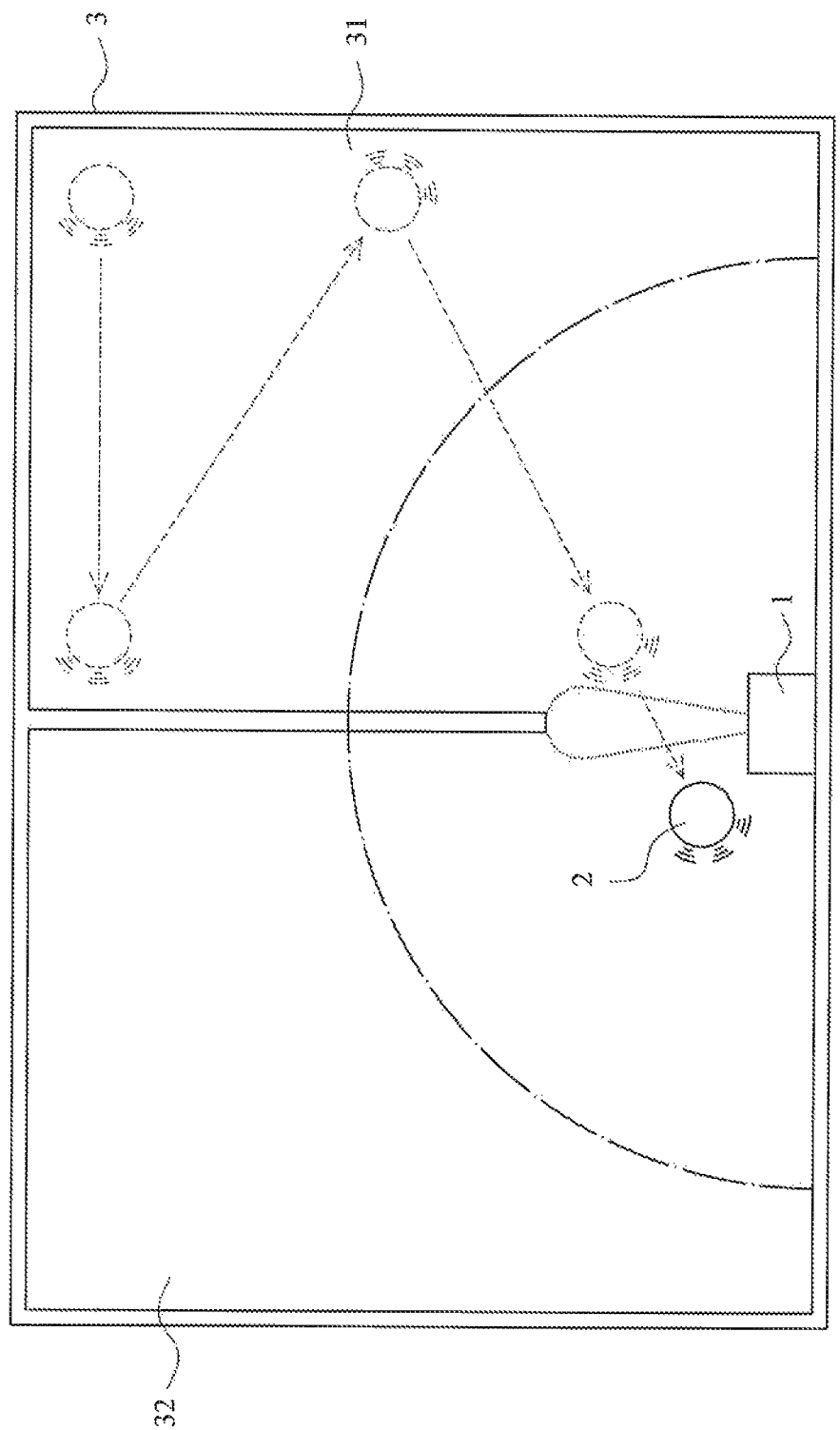
FIG. 1 is an above view of the working space, which illustrates the robot 2 being confined in accordance with the virtual wall signal emitting from the virtual wall device 1, the robot 2 gets into the second work area 32.
Figure 2:
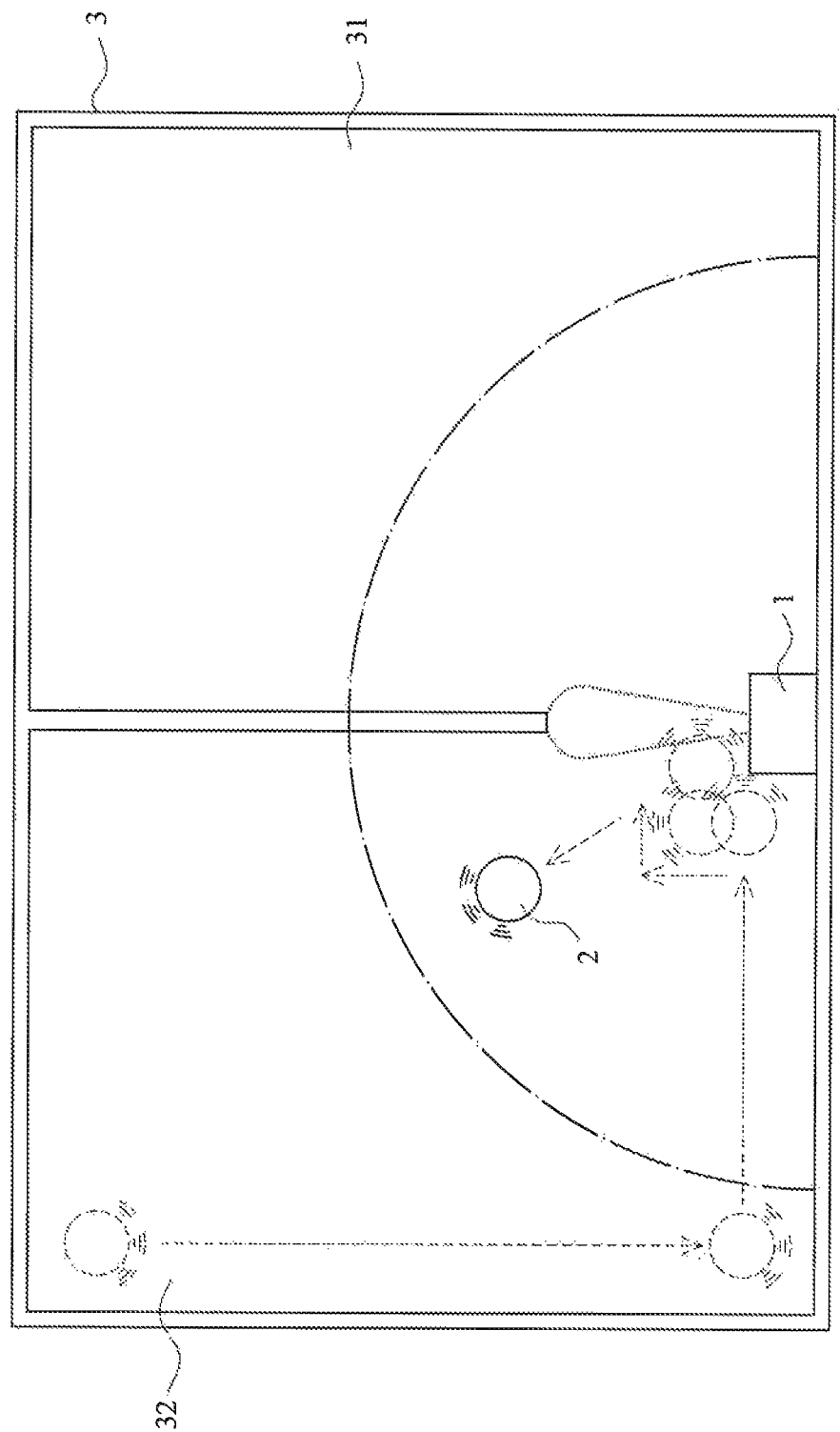
FIG. 2 is an above view of the working space, which illustrates the robot 2 being confined in accordance with the virtual wall signal emitting from the virtual wall device 1, the robot 2 stays inside the second work area 32.
Figure 3:
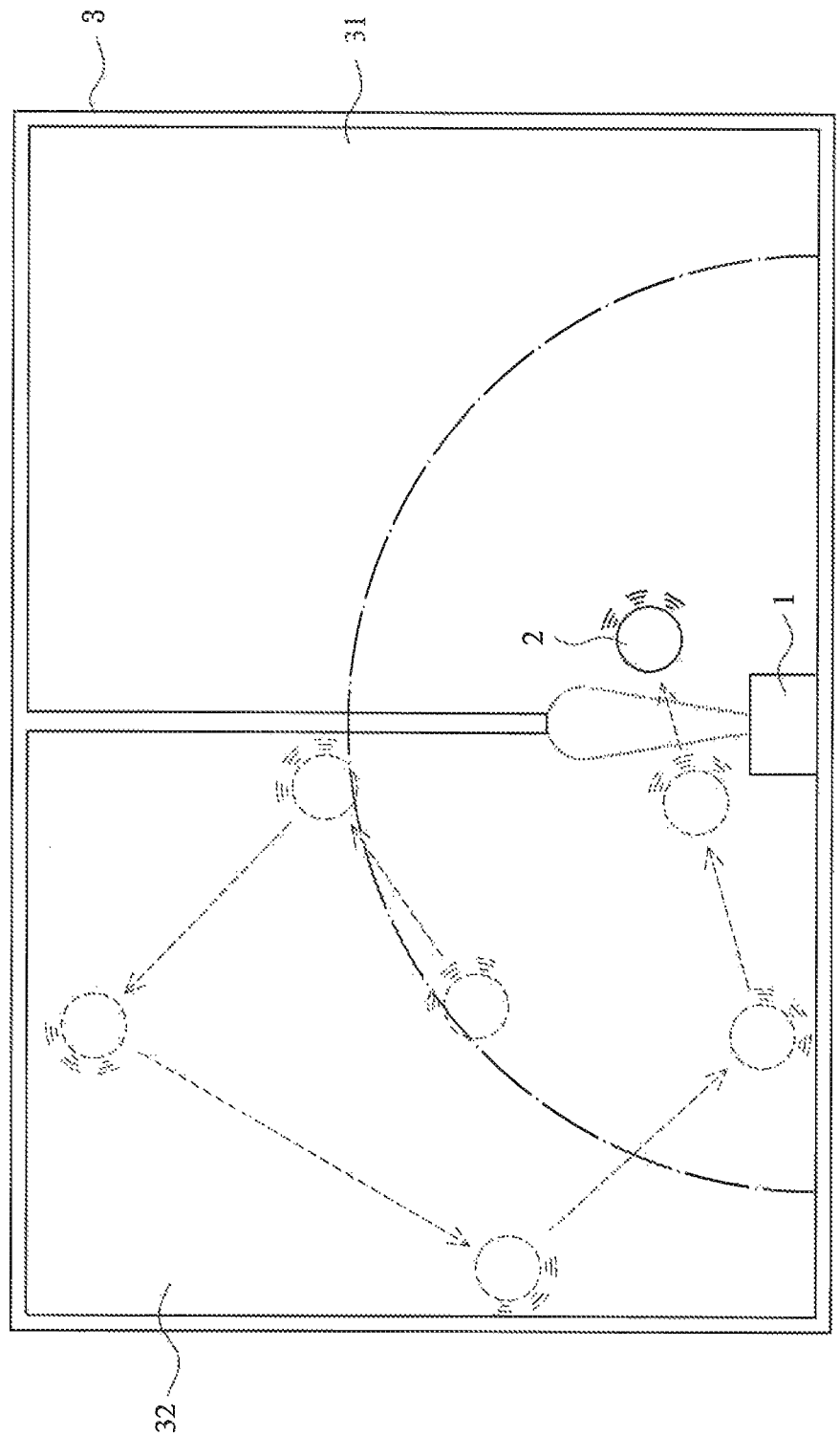
FIG. 3 is an above view of the working space, which illustrates the robot 2 being confined in accordance with the virtual wall signal emitting from the virtual wall device 1, the robot 2 gets into the first work area 31.
Figure 4:
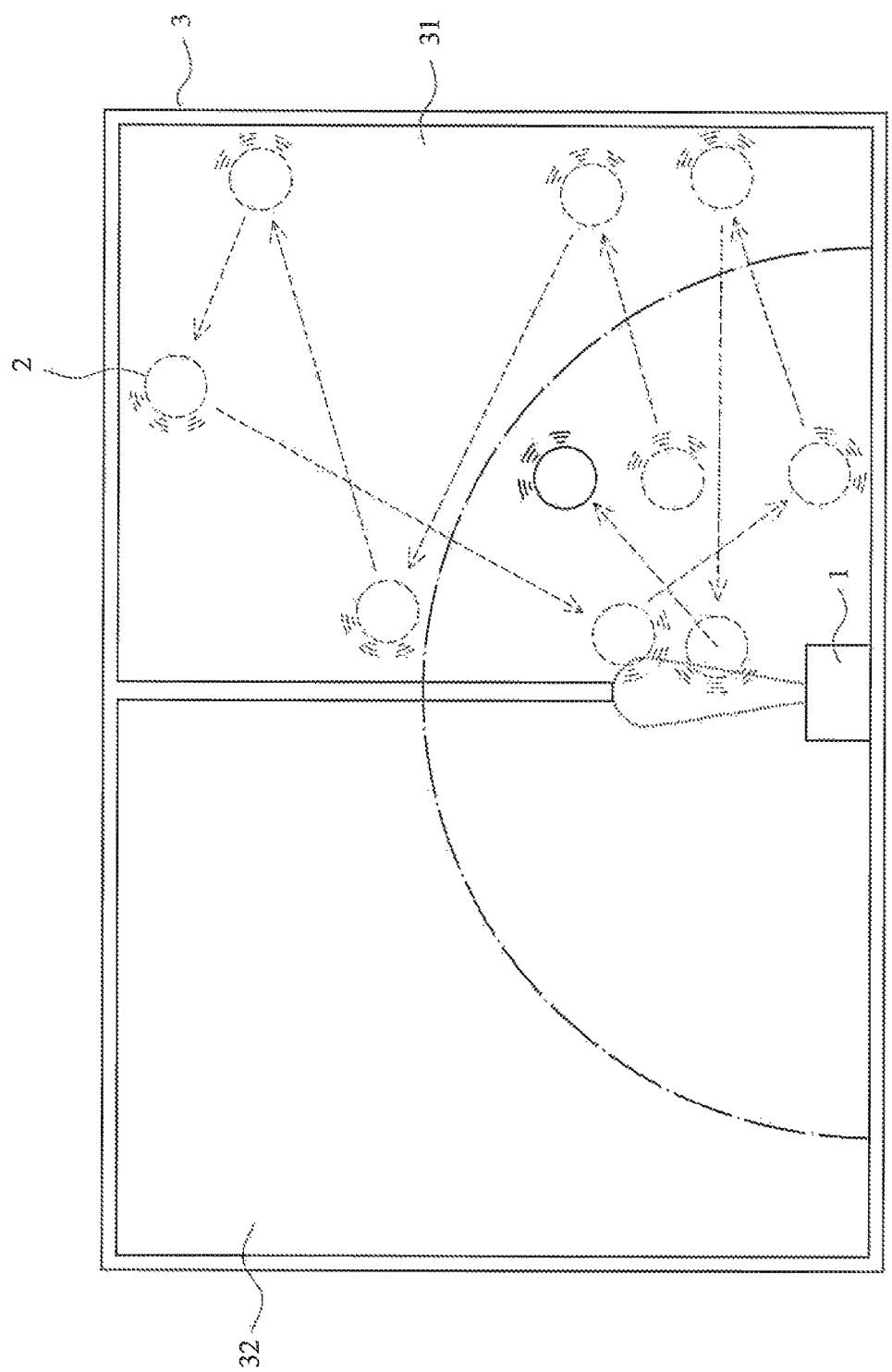
FIG. 4 is an above view of the working space, which illustrates the robot 2 being confined in accordance with the virtual wall signal emitting from the virtual wall device 1, the robot 2 stays inside the first work area 31.

The descriptions based on embodiments and accompanying drawings are shown as follows:

FIG. 1 illustrates the system of confining robot movement actions, which comprises a virtual wall device 1 and a robot 2, the virtual wall device 1 is placed in a work space 3, such as the ground beside a doorframe or the upper edge of a doorframe in an indoor space, the virtual wall device 1 is capable of receiving a barrier detection signal from a specific direction or omni-directionally in a predetermined receiving range 10 within the work space 3. Once the virtual wall device 1 receives the barrier detection signal in the predetermined receiving range 10, said virtual wall device 1 starts to emit a virtual wall signal over a predetermined emitting range 12, which can be considered as virtually divides the work space 3 into a first work area 30 and a second work area 32; moreover, the virtual wall device 1 would terminate the emission of the virtual wall signal when it no longer receiving the barrier detection signal in said predetermined receiving range 10.

The robot 2 can be any robot capable of moving and operating, such as a cleaning robot or a service robot. Said robot 2 emits the barrier detection signal during its cruising within the work space 3. Its cruise can be selective from multiple movement modes, such as random mode, spiral route mode, S-shaped route mode or intelligent pattern route mode. Moreover, when the robot 2 moves into said predetermined emitting range 12 of the virtual wall signal and then receives said virtual wall signal, it starts to decide whether to get across the predetermined emitting range 12 or not based on the difference of the virtual wall signals, this is how the system and the method of present invention confine the operation of said robot 2 in the first work area 30 or the second work area 32.

In order to control the robot 2 for passing or leaving said predetermined emitting range 12, once the virtual wall device 1 receives the barrier detection signal, it modulates an escape command into the virtual wall signal, wherein the escape command is of use to direct the robot 2 to move backward, reroute or the combination thereof. Moreover, the virtual wall device 1 further stores an identity information and a confining time information, wherein the identity information is an unique coded identity of the virtual wall device 1 and the confining time information is the time limitation set by the user for confining said robot 2 in the second work area 32. The confining time information can be adjusted according to the size of the second work area 32, for example, it would be ideal to set the confining time information as 30 minutes for a room between 23 to 33 square meters or 20 minutes for a room smaller than 23 square meters. The virtual wall device 1 is provided with a switch which is of use to adjust the confining time information. Furthermore, said virtual wall device 1 combines then modulates the escape command, the identity information and the confining time information into the virtual wall signal.

When said robot 2 receives the virtual wall signal, it demodulates the virtual wall signal into the escape command, identity information and confining time information. The robot 2 then generates a passing record 20 which including the history of receiving the identity information and the confining time information. The robot 2 starts to countdown according to the confining time information from said robot 2 first getting across the predetermined emitting range of the virtual wall signal, as the example embodiment, the countdown of the confining time starts from the robot 2 passing the set emitting range 12.

FIG. 1, FIG. 2, FIG. 3 and FIG. 4 respectively demonstrates several behaviors of movement of robot 2 when it receives said virtual wall signal, comprising:

1. The First Behavior:

The robot 2 moving in the first work area 30 receives the virtual wall signal and demodulates the virtual wall signal into the escape command, identity information and confining time information. Said robot 2 checks the passing record 20 for ensuring whether the identity information has ever been recorded; the robot 2 would not execute the escape command and moves across the predetermined emitting range 12 of the virtual wall signal and gets into the second work area 32 since no identical identity information of the virtual wall device can be found from the passing record 20;

2. The Second Behavior:

The robot 2 cruising in the second work area 32 receives the virtual wall signal and demodulates the virtual wall signal into the escape command, identity information and confining time information. Said robot 2 checks the passing record 20 for ensuring whether the identity information has ever been recorded; the robot 2 would execute the escape command because the identical identity information can be discovered from the passing record 20 and the countdown of the confining time does not finished, said robot 2 stays in the second work area 32;

3. The Third Behavior:

The robot 2 cruising in the second work area 32 receives the virtual wall signal and demodulates the virtual wall signal into the escape command, identity information and confining time information. Said robot 2 checks the passing record 20 for ensuring whether the identity information has ever been recorded; the robot 2 would not execute the escape command since the identical identity information can be found in the passing record 20 and the countdown of the confining time is finished, said robot 2 can pass the predetermined emitting range 12 of the virtual wall signal to get into the first work area 30;

4. The Fourth Behavior:

The robot 2 cruising in said first work area 30 receives the virtual wall signal and demodulates the virtual wall signal into the escape command, identity information and confining time information. Said robot 2 checks the passing record 20 for ensuring whether the identity information has ever been recorded; the robot 2 would execute the escape command since the identical identity recognition information can be found in the passing record 20 and the countdown of the confining time is finished, said robot 2 stays in the first work area 30.

Figure 5:
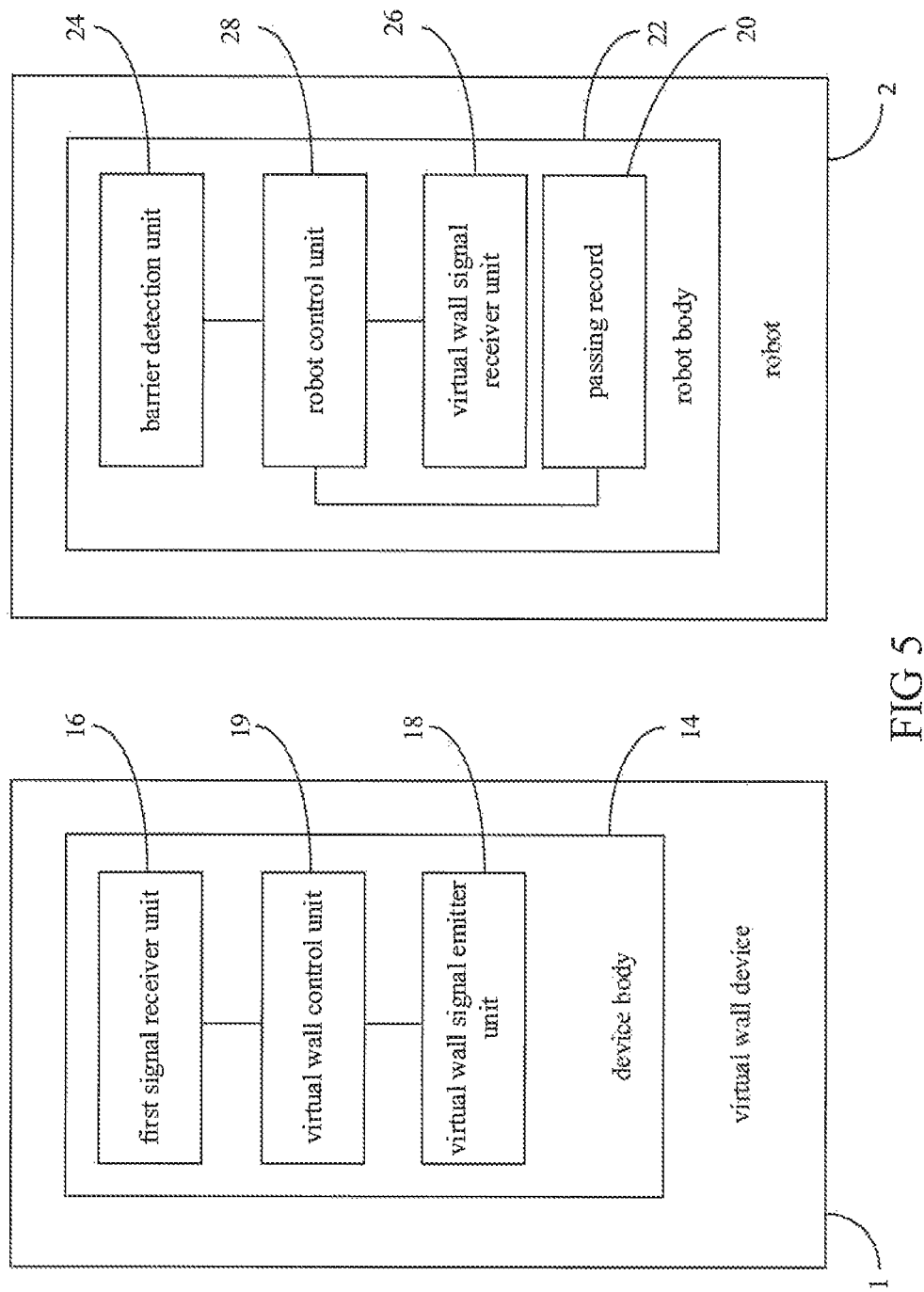
FIG. 5 is a figure displays the components of the virtual wall device 1 and the robot 2.

FIG. 5 shows the components of the virtual wall device 1 in present invention, comprising: a device body 14, a first signal receiver unit 16, a virtual wall signal emitter unit 18 and a virtual wall control unit 19; the device body 14 is settled in the work space 30; the first signal receiver unit 16 is configured on said device body 14 for receiving the barrier detection signal; the virtual wall signal emitter unit 18 is also installed on the device body 14, it is configured for emitting the virtual wall signal toward the work space 3 and terminating the emission; the virtual wall control unit 19 is installed on the device body 14, connected with the first signal transmitter unit 16 and the virtual wall signal transmitter unit 18, said virtual wall control unit 19 is configured for receiving the barrier detection signal via the first signal receiver unit 16 and triggering the virtual wall signal transmitter unit 18 to emit said virtual wall signal in response to the barrier detection signal; wherein once the virtual wall control unit 19 receives the barrier detection signal, it triggers the transmission of the escape command, the identity information and the confining time information from the virtual wall control unit 19 to said virtual wall signal transmitter unit 18, in which the escape command, the identity information and the confining time information would be modulated into the virtual wall signal.

FIG. 5 also illustrates the components of said robot 2 in the present disclosure, comprising a robot body 22, a barrier detection unit 24, a virtual wall signal receiver unit 26 and a robot control unit 28; the robot body 22 moves and operates inside the work space 3; the barrier detection unit 24 on the robot body 22 starts to emit the barrier detection signal when any barrier being detected in its patrol; the virtual wall signal receiver unit 26 is configured on the robot body 22 for receiving the virtual wall signal and demodulating the virtual wall signal into said escape command, identity information and confining time information; the robot control unit 28 which is installed in the robot body 22 is connected to the barrier detection unit 24 and the virtual wall signal receiver unit 26, it controls the barrier detection unit 24 for emitting the barrier detection signal continuously while the robot body 22 cruising; the robot control unit 28 receives the virtual wall signal through the virtual wall signal receiver unit 26 and controls the robot body 22 according to the escape command, the identity information and the confining time information, which are demodulated from said virtual wall signal. The confinement to the robot body 22 includes: moving from the first work area 30, across the predetermined emitting range 12, to the second work area 32; moving from said second work area 32, across the predetermined emitting range 12, to said first work area 30 or avoiding from getting across the predetermined transmitting range 12.

Figure 6:
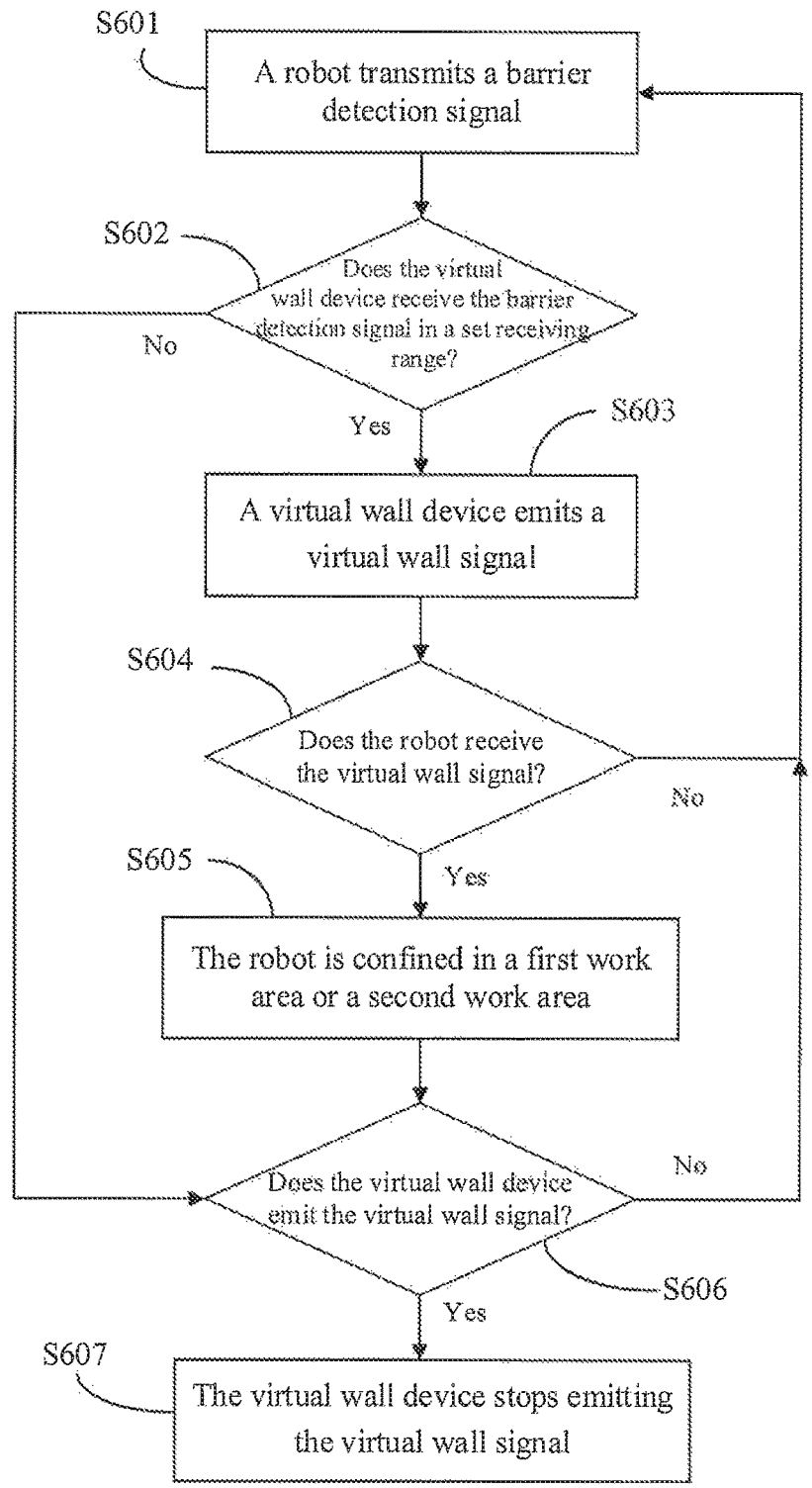
FIG. 6 is a flow chart of the process of the signal transmitting between the virtual wall device and the robot.

Referring to FIG. 6, which illustrates the method of confining robot movement actions applying between the virtual wall device and the robot, the steps are shown as follows:

(S601) The robot continuously emits a barrier detection signal while cruising in a work space;

(S602) The virtual wall device chooses to execute step (S603) or step (S606) based on whether it receives the barrier detection signal;

(S603) The virtual wall device receives the barrier detection signal in the predetermined receiving range then emits a virtual wall signal which divides the work space is into two sections: a first work area and a second work area;

(S604) The moving robot chooses to execute step (S605) or step (S601) based on whether it receives the virtual wall signal;

(S605) The robot moves across or leaves the predetermined emitting range of the virtual wall signal according to virtual wall signal, which confines the robot in the first work area or the second work area;

(S606) The virtual wall device keep emitting the virtual wall signal choose to execute step (S607) or step (S602) based on whether it receives barrier detection signal in the predetermined receiving range;

(S607) The virtual wall device receives no barrier detection signal in the predetermined receiving range, it terminates the emission of the virtual wall signal return to step (S601).

Figure 7:
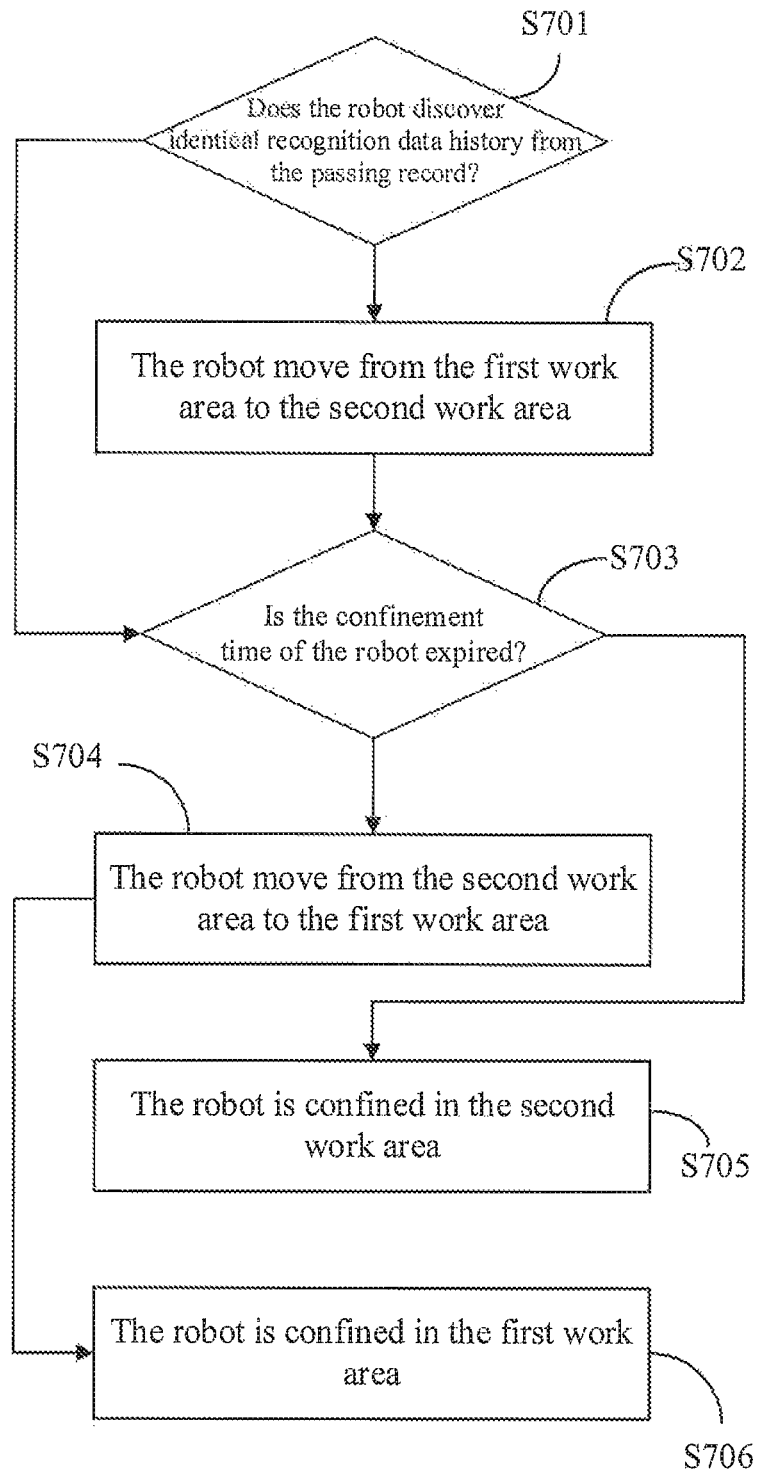
FIG. 7 is a flow chart of the process of the robot deciding whether to access another work area or not.

In the present disclosure, the virtual wall device receives the barrier detection signal then modulates a combination of the escape command, the identity information and the confining time information into a virtual wall signal in order to confine the robot for passing or leaving the predetermined emitting range. A passing record stored in said robot is to record the confining time data and the identity information that has ever received by the robot. FIG. 7 also shows the steps of the robot received the virtual barrier signal for passing or dodging from the predetermined emitting range of the virtual barrier signal, comprising:

(S701) The robot chooses to execute step (S702) or step (S703) based on whether the identity recognition data can be discovered in the passing record;

(S702) The robot checks the passing record, which indicates that the robot was located within the first work area. Therefore the robot refuses to execute the escape command so it gets across the predetermined emitting range of the virtual wall signal and records the received identity recognition data on the passing record;

(S703) The robot cruising in the second work area receives the virtual wall signal and executes step (S704) or step (S705) based on (S701);

(S704) The robot cruising in the second work area receives the virtual wall signal, it would refuse to execute the escape command if an identical identity recognition data can be found in the passing record and the received confining time is expiring, said robot passes the predetermined emitting range of the virtual wall signal and enters the first work area for executing step (S706);

(S705) The robot cruising in the second work area receives the virtual wall signal, it would execute the escape command if the identical identity recognition data can be found in the passing record and the confining time is not expiring, the robot is therefore be confined in the second work area for executing step (S703);

(S706) The robot operating in the first work area receives the virtual wall signal, it would execute the escape command if an identical identity recognition data can be found in the passing record and the confining time is expiring, the robot is confined in the first work area.

In U.S. Pat. No. 7,579,803, the robot is required to execute a barrier avoidance algorithm to help its robot for deciding. Furthermore, in the present disclosure, no additional component needs to be settled on the robot, which can reduce the costs of robot manufacturing.

In the present disclosure, the virtual wall device only emits a virtual signal after it receives the barrier detection signal; so the drawback of high power consumption in U.S. Pat. No. 7,579,803 is therefore resolved by present invention because there is no necessity of continuous transmission for the barrier signal device.

Moreover, compared to the mobile robot in China Patent Number CN102048499, in present invention, the robot needs fewer components to accomplish the tasks of cleaning several rooms; in addition, said virtual wall device in the present invention do not need to transmit reply signal in response to the signal from the mobile robot, it makes the power consumption even lower.

When multiple virtual wall devices are settled in the work space, they can virtually divide said work space into several work areas correspondingly; since that each virtual wall device has a unique identity information and set with different confining time information, the robot can be therefore confined and operates in any of divided work space according to user's setting. It can be seen that the present invention indeed provides unanticipated effects against prior arts.

The examples and embodiments above are provided for better understanding but not limiting the scope of present invention. Any equivalent change or modification without departing from the scope of present invention should be included in claims herein.

What is claimed is:

1. A system of confining robot movement actions, comprising:

a virtual wall device placed in a work space for receiving a barrier detection signal in a predetermined receiving range;

said virtual wall device is configured for emitting a virtual wall signal in a predetermined emitting range after receiving the barrier detection signal, the virtual wall signal virtually divides the work space into a first work area and a second work area;

said virtual wall device is configured for terminating the emission of said virtual wall signal when the barrier detection signal is no longer received;

a robot, operating in the work space, configured for emitting the barrier detection signal and receiving said virtual wall signal in the predetermined emitting range;

said robot also being configured for deciding whether to cross the predetermined emitting range so as to confine the operation of said robot in the first work area or the second work area, wherein the virtual wall device comprises:

a device body configured for being placed in the work space;

a first signal receiver unit attached to the device body for receiving the barrier detection signal;

a virtual wall signal emitter unit attached to the device body for emitting the virtual wall signal toward a direction in the work space;

a virtual wall control unit attached to the device body, connecting to the first signal receiver unit and the virtual wall signal emitter unit;

wherein said virtual wall control unit is configured for receiving the barrier detection signal via the first signal receiver unit, triggering the virtual wall signal emitter unit to emit the virtual wall signal, wherein the virtual wall device modulates an escape command when receives the detection signal into the virtual wall signal, wherein the robot is confined to pass or escape from the predetermined emitting range of the virtual wall signal based on the escape command, wherein said virtual wall device is configured with an identity information and a confining time information, wherein said virtual wall signal is modulated upon the escape command, the identity information and the confining time information;

wherein the confining time information determines a time of said robot being confined in the second work area, wherein said robot demodulates said virtual wall signal, when receives the virtual wall signal, into the escape command, the identity information and the confining time information;

said robot further stores a passing record, which is a history record of whether said robot has received the identity information and the confining time information from the virtual wall device;

said robot starts to countdown, according to the confining time information, from the robot entering into the second work area across the predetermined emitting range of said virtual wall signal;

said robot then executes several behaviors when receiving the virtual wall signal, the behaviors comprising:

the robot, operating in the first work area, receives the virtual wall signal and checks no identical identity information from the history of said passing record, the robot refuses to execute said escape command and then enters into the second work area;

the robot operating in the second work area receives the virtual wall signal, the robot checks identical identity information from the history of said passing record and countdown of the confining time is not timed out, the robot executes said escape command for staying in the second work area;

the robot operating in the second work area receives the virtual wall signal, the robot checks identical identity information from the history of said passing record and the countdown of the confining time is timed out, the robot refuses to execute said escape command and then enters into the first work area;

the robot operating in the first work area receives the virtual wall signal, the robot checks identical identity information from the history of said passing record and the countdown of the confining time is timed out, the robot executes said escape command for staying in the first work area.

2. The system of confining robot movement actions of claim 1, wherein the escape command is an action command to said robot, which comprising the action of moving backward, redirecting or the combination thereof.

3. The system of confining robot movement actions of claim 1, wherein the robot comprises:

a robot body, which is configured to move and operate in the work space;

a barrier detection unit, set on the robot body, configured to emit the barrier detection signal toward a direction in the work space for detecting barriers;

a virtual wall signal receiver unit, set on the robot body, configured to receive the virtual wall signal when said robot enters the predetermined emitting range of the virtual wall signal;

a robot control unit, set on the robot body, connecting to the barrier detection unit and the virtual wall signal receiver unit, which is configured to trigger the barrier detection unit for emitting the barrier detection signal when the robot body is moving;

wherein, when the robot control unit receives the virtual wall signal via the virtual wall signal receiver unit, the robot determines whether to get across the predetermined emitting range of the virtual wall signal based upon the virtual wall signal after said robot demodulates said virtual wall signal, which confines said robot to enter or stay in the first work area or the second work area.

4. A method of confining robot movement action, applied on a virtual wall device and a robot in a work space, comprising:

emitting a barrier detection signal, from the robot in operation which is moving in a work space;

detecting and receiving the barrier detection signal, by the virtual wall device, in a predetermined receiving range in the work space;

emitting a virtual wall signal, via the virtual wall device, for dividing the work space into a first work area and a second work area when the virtual wall device receives the barrier detection signal;

receiving the virtual wall signal, by the robot;

determining to pass or escape, by the robot, from the predetermined emitting range of the virtual wall signal, which confines the robot to operate in the first work area or the second work area, wherein the virtual wall signal comprises an escape command, an identity information and a confining time information, wherein the escape command is to control whether the robot escapes from the predetermined emitting range of the virtual wall signal;

wherein a passing record is stored by the robot, which is a history record of whether the identity information and the confining time information has ever been received, said robot checks the passing record when each time receives the virtual wall signal, the robot decides to pass or escape from the predetermined emitting range of the virtual wall signal according to several steps, the steps comprising:

checking whether the identity information from the virtual wall signal has ever recorded in the passing record when the robot receives the virtual wall signal;

if no identical identity information can be discovered from the passing record, said robot refuses to execute the escape command for passing from the first work area, through the predetermined emitting range of the virtual wall signal, to the second work area, the robot then records the identity information on said passing record;

starting to countdown the confining time based upon the confining time information from the virtual wall signal, the confining time determines whether said robot passes the range of said virtual wall signal;

if identical identity information can be found from the passing record and the countdown of the confining time has not timed out, said robot executes the escape command for staying in the second work area; if identical identity information can be found from the passing record and the countdown of the confining time has timed out, the robot refuses to execute the escape command for entering into the first work area.

\* \* \* \* \*